United States Patent [19]

Henderson

[11] Patent Number: 4,878,830
[45] Date of Patent: Nov. 7, 1989

[54] SUBSTOICHIOMETRIC FUEL FIRING FOR MINIMUM $NO_x$ EMISSIONS

[75] Inventor: James K. Henderson, New Orleans, La.

[73] Assignee: Exxon Research and Engineering Company, Florham Park, N.J.

[21] Appl. No.: 315,880

[22] Filed: Feb. 24, 1989

Related U.S. Application Data

[63] Continuation-in-part of Ser. No. 208,610, Jun. 20, 1988, abandoned.

[51] Int. Cl.[4] .............................................. F23M 3/04
[52] U.S. Cl. ........................................ 431/10; 431/75; 423/235
[58] Field of Search ............................. 431/10, 12, 75; 126/351; 60/39.5; 423/212, 235

[56] References Cited

U.S. PATENT DOCUMENTS

| | | | |
|---|---|---|---|
| 3,832,122 | 8/1974 | La Haye et al. | 431/10 |
| 3,837,788 | 9/1974 | Craig et al. | 431/351 |
| 3,873,671 | 3/1975 | Reed et al. | 423/235 |
| 3,911,083 | 10/1975 | Reed et al. | 423/235 |
| 3,914,091 | 10/1975 | Yamagishi et al. | 431/10 |
| 3,955,909 | 5/1976 | Craig et al. | 431/10 |
| 4,013,399 | 3/1977 | Craig et al. | 431/351 |
| 4,033,725 | 7/1977 | Reed et al. | 23/277 |
| 4,050,877 | 9/1977 | Craig et al. | 431/76 |
| 4,244,325 | 1/1981 | Hart et al. | 122/4 R |
| 4,395,223 | 7/1983 | Okigami et al. | 431/10 |
| 4,405,587 | 9/1983 | McGill et al. | 431/10 X |

OTHER PUBLICATIONS

Application of $NO_x$ Control Techniques to Industrial Boilers, M. P. Heap et al., AIChE Symposium Series, No. 175, vol. 74, pp. 115–125, 1978.
Controlling Nitrogen Oxides, Research Seminar, EPA-600/8-80-004, Feb. 1980.
Combustion, 2nd Edition, Irvin Glassman, Academic Press, Inc., 1987.

Primary Examiner—Randall L. Green
Attorney, Agent, or Firm—Henry E. Naylor

[57] ABSTRACT

Disclosed is a method for combusting hydrocarbonaceous fuels such that minimal amounts of $NO_x$ are produced. This is accomplished by combusting the fuel in a first stage at substoichiometric conditions followed by a second stage combustion at conditions to complete combustion wherein the temperature of the combustion gases exiting the first stage is specifically controlled by a heat transfer device so that they are at least 500° F. lower than the combustion temperature of the first stage but not lower than the ignition temperature of the combustion gases exiting the heat transfer device.

5 Claims, 1 Drawing Sheet

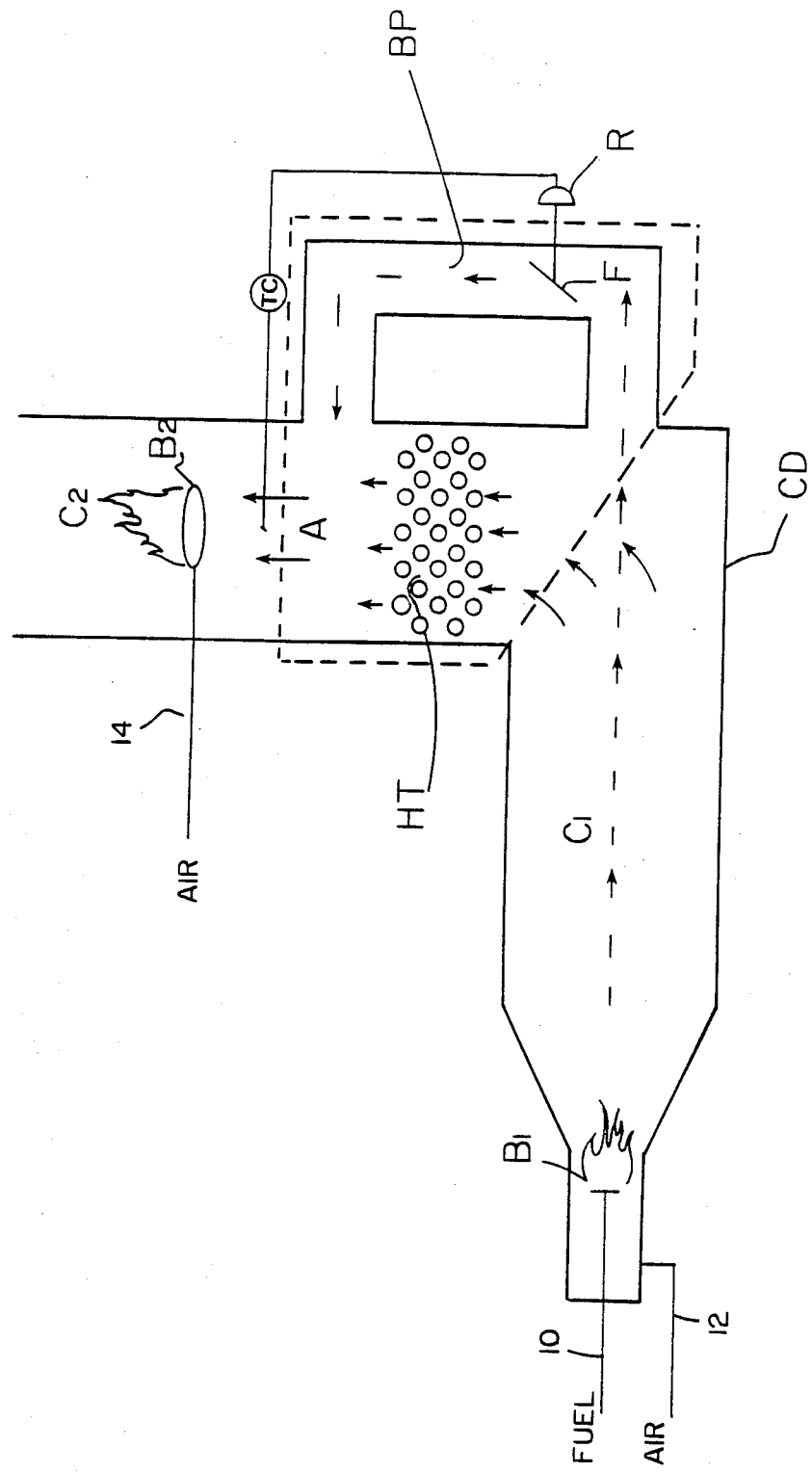

SUBSTOICHIOMETRIC FUEL FIRING FOR MINIMUM $NO_x$ EMISSIONS

CROSS REFERENCE TO RELATED APPLICATIONS

This application is a Continuation-in-part of U.S. patent application Ser. No. 208,610, filed June 20, 1988, abandoned.

FIELD OF THE INVENTION

The present invention relates to a two-stage combustion process for hydrocarbonaceous fuels with minimal $NO_x$ production.

BACKGROUNDS OF THE INVENTION

Combustion effluents are a major source of air pollution. One type of particularly troublesome pollutant found in many combustion effluent streams is nitrogen oxides ($NO_x$). Concern over $NO_x$ emissions is based on known cases of human health problems and environmental damage caused by $NO_x$ or compounds derived from $NO_x$. $NO_x$ contributes to the formation of photochemical oxidants, commonly known as smog. Hydrocarbons react with $NO_x$ in the presence of sunlight to form these oxidants, which can have severe effects on the respiratory system. $NO_x$ can also be converted into nitric acid, one of the two principle components of acid rain.

Some of the major sources of $NO_x$ generated by man are stationary installations such as gas and oil fired steam boilers for electric power plants, process heaters, incinerators, coal fired utility boilers, glass making furnaces, cement kilns, oil field steam generators, gas turbines, and the like.

Various methods have been developed for reducing the concentration of $NO_x$ in combustion effluents. Such methods include the use of ammonia injection, catalytic conversion, as well as new designs and methods of operating combustion devices, such as burners. With regard to burner design and methods of operating burners to reduce $NO_x$ emissions, staged combustion has proven successful on a commercial scale for moderate reduction of $NO_x$ emissions.

In staged combustion, an oxygen-containing gas, particularly air, is typically supplied to the burner in the initial combustion stage at less than the amount needed to completely burn the fuel. Use of less than a stoichiometric amount of oxygen to fuel in the initial stage reduces $NO_x$ emissions due to the lack of oxygen required for $NO_x$ formation. The second stage combustion then completes the burning by introducing additional oxygen-containing gas into the combustion gases of the first combustion stage.

In conventional two-stage combustion, the second stage final combustion temperature usually approaches the same temperature as that of a one-stage combustion process, since only a relatively minor amount of heat is removed due to some uncontrolled passive heat transfer to the surrounding burner environment. Temperature is also an important factor in thermal $NO_x$ formation, since higher temperatures generate more $NO_x$.

*Application of $NO_x$ Control Techniques To Industrial Boilers*, M. P. Heap et al. Air Pollutants—$NO_x$ and Particulate Emissions, AIChe Symposium Series, No. 175, Vol. 74, pp 115 to 125, 1978; and Controlling Nitrogen Oxides, Research Seminar, EPA-600/8-80-004, and *Combustion*, 2nd edition, Irvin Glassman, Academic Press, 1987 discuss two-stage combustion processes.

Further, U.S. Pat. Nos. 3,832,122; 3,837,788; 3,955,909; 4,013,399; and 4,050,877 teach air pollution control systems wherein the emission of $NO_x$ is reduced whereby less than a stoichiometric amount of air is fed into a primary combustion chamber so that the resulting combustion gases contain significant proportions of unburnt hydrocarbons and carbon monoxide due to incomplete combustion. This is then followed by injection of a regulated secondary air supply into the gases exiting the primary combustion chamber in order to complete combustion of all unburnt fuel in a secondary combustion zone.

Also, U.S. Pat. Nos. 3,873,671; 3,911,083; 4,033,725; and 4,244,325 teach variations of a process for disposing of oxides of nitrogen by injecting said oxides into a combustion chamber where they are mixed with an excess of combustible products generated by burning a hydrocarbon fuel with less than its stoichiometric requirements of oxygen at a temperature from about 1200° F. to 2000° F. The oxides of nitrogen are thus reduced and safely vented to the atmosphere.

While such methods of combustion may have met with commercial success, there still exists a need in the art for improved methods of combustion which can further reduce $NO_x$ emission levels.

SUMMARY OF THE INVENTION

In accordance with the present invention, there is provided a method for combusting hydrocarbonaceous fuels such that minimal amounts of $NO_x$ are produced. The method comprises: (a) introducing a mixture of fuel and an oxygen-containing gas into a first stage combustion zone at substoichiometric conditions of oxygen to fuel; (b) combusting the mixture of fuel and oxygen-containing gas to oxygen depletion; (c) passing the first stage combustion gases to a heat transfer device for heat removal which is controlled by: (i) continuously monitoring the temperature of the combustion gases exiting the heat transfer device, (ii) relaying said temperature information to a control mechanism associated with the heat transfer device, and (iii) controlling the amount of heat removed from the first stage combustion gases such that the temperature of the combustion gases are lowered to a range of at least 500° F. below the combustion temperature of the first stage, but not lower than the ignition temperature of the combustion gases exiting the heat transfer device; and (d) passing said combustion gases exiting the heat transfer device to a second combustion zone where a sufficient amount of oxygen-containing gas is introduced into the combustion gas stream to complete combustion of the remaining combustible gases.

DETAILED DESCRIPTION OF THE INVENTION

Referring to the FIGURE hereof, fuel is introduced via line 10, and air via line 12, to burner $B_1$, fuels suitable for use herein are any fuel which is combustible with air or other oxygen-containing gases. Non-limiting examples of such fuels include natural gas, petroleum naphtha, fuel oil, coal, wood, and hydrogen. The fuel/air mixture is combusted in a first combustion zone $C_1$ of combustion device CD at substoichiometric conditions. That is, with an insufficient amount of air to completely combust the fuel. By insufficient amount of air, I mean from the minimum amount of air needed to perform combustion of the fuel without flameout or excessive production of soot, up to, but not including, a stoichiometric amount of oxygen to fuel. It is preferred that the amount of air used in this first combustion zone be from about 0.75 to 0.9 stoichiometric. By operating this first combustion stage at substoichiometric conditions of air to fuel, only negligible $NO_x$ will be formed due to the absence of oxygen in the combustion gases. The oxygen will be preferentially depleted by the burning of the hydrocarbonaceous fuels. Several combustion components from the fuel are also formed which are not fully oxidized due to this absence of oxygen. For hydrocarbon fuels, such components include carbon particles, carbon monoxide, hydrogen, etc. Consequently, the combustion gases from the first combustion zone, while containing little if any oxides of nitrogen, contain non-combusted fuel components. These combustion gases are passed through heat transfer device HT where they are cooled to a temperature of at least 500° F. lower than the combustion temperature of the first combustion zone. The gases are then passed through zone A to a second combustion zone $C_2$ where they are mixed with a sufficient amount of air via line 14 to burner $B_2$ to cause complete combustion, or burning, of the incompletely oxidized fuel components. A critical feature of the present invention is controlling the temperature of the combustion gases at zone A between the first and second combustion zones, such that the second stage of combustion cannot generate sufficiently high temperatures for significant $NO_x$ formation when air in excess of stoichiometric is introduced into the second combustion zone. The temperature of the combustion gases at zone A is controlled by passing the combustion gases from the first combustion zone through a heat transfer device HT, continuously monitoring the temperature of the combustion gases at zone A which is immediately downstream of the heat transfer device HT, and regulating the heat removal from the combustion gases of said first zone to ensure that the temperature of the combustion gases entering the second combustion zone is at least 500° F. lower, preferably at least 700° F. lower, more preferably at least 1,000° F. lower, than the temperature of the first stage combustion gases before they enter the heat transfer device HT, but not so low that second stage flameout (or failure to ignite) occurs. A preferred method of controlling the temperature of the combustion gas at zone A is by use of an electromechanical system which continuously monitors the temperature of the combustion gases at zone A immediately downstream of the heat transfer device HT with thermocouple TC, which relays information to regulator R, which adjusts the opening of flue F to allow passage of the appropriate amount of combustion gases through by-pass section BP, thereby resulting in a specifically controlled temperature for the mixed combustion gases at zone A immediately upstream of burner $B_2$ in the second combustion zone $C_2$.

What is claimed is:

1. A method for combusting hydrocarbonaceous fuels such that minimum amounts of $NO_x$ are produced, which process comprises:
   (a) introducing a mixture of fuel and an oxygen-containing gas into a first combustion zone at substoichiometric conditions of oxygen to fuel,
   (b) combusting the mixture of fuel and oxygen-containing gas to oxygen depletion,
   (c) passing the combustion gases to a heat transfer device for heat removal which is controlled by continuously monitoring the temperature of the combustion gases exiting the heat transfer device, at least a portion of the gases being cooled by heat exchange relaying said temperature information to a control mechanism associated with the heat transfer device which controls the amount of heat removed from the combustion gases such that the temperature of the combustion gases are lowered to a range of at least 500° F. below the combustion temperature of the first stage, but not lower than the ignition temperature of the combustion gases exiting the heat transfer device; and
   (d) passing said combustion gases exiting the heat transfer device to a second combustion zone where a sufficient amount of oxygen-containing gas is introduced into the combustion gas stream to complete combustion of the remaining combustible gases.

2. The method of claim 1 wherein the hydrocarbonaceous fuel is selected from the group consisting of natural gas, petroleum naphtha, and fuel oil 3. The method of claim 2 wherein the first combustion zone is at 0.75 to 0.90 stoichiometric and the oxygen-containing gas is air.

4. The method of claim 3 wherein the temperature of the combustion gases from the first combustion zone are lowered at least 700° F. before introducing them into the second combustion zone.

5. The method of claim 4 wherein the temperature of the combustion gases from the first combustion zone are lowered at least 1000° F. before introducing them into the second combustion zone.

* * * * *